(No Model.)
J. K. CUMMINGS.
COFFEE POT.
No. 495,693. Patented Apr. 18, 1893.
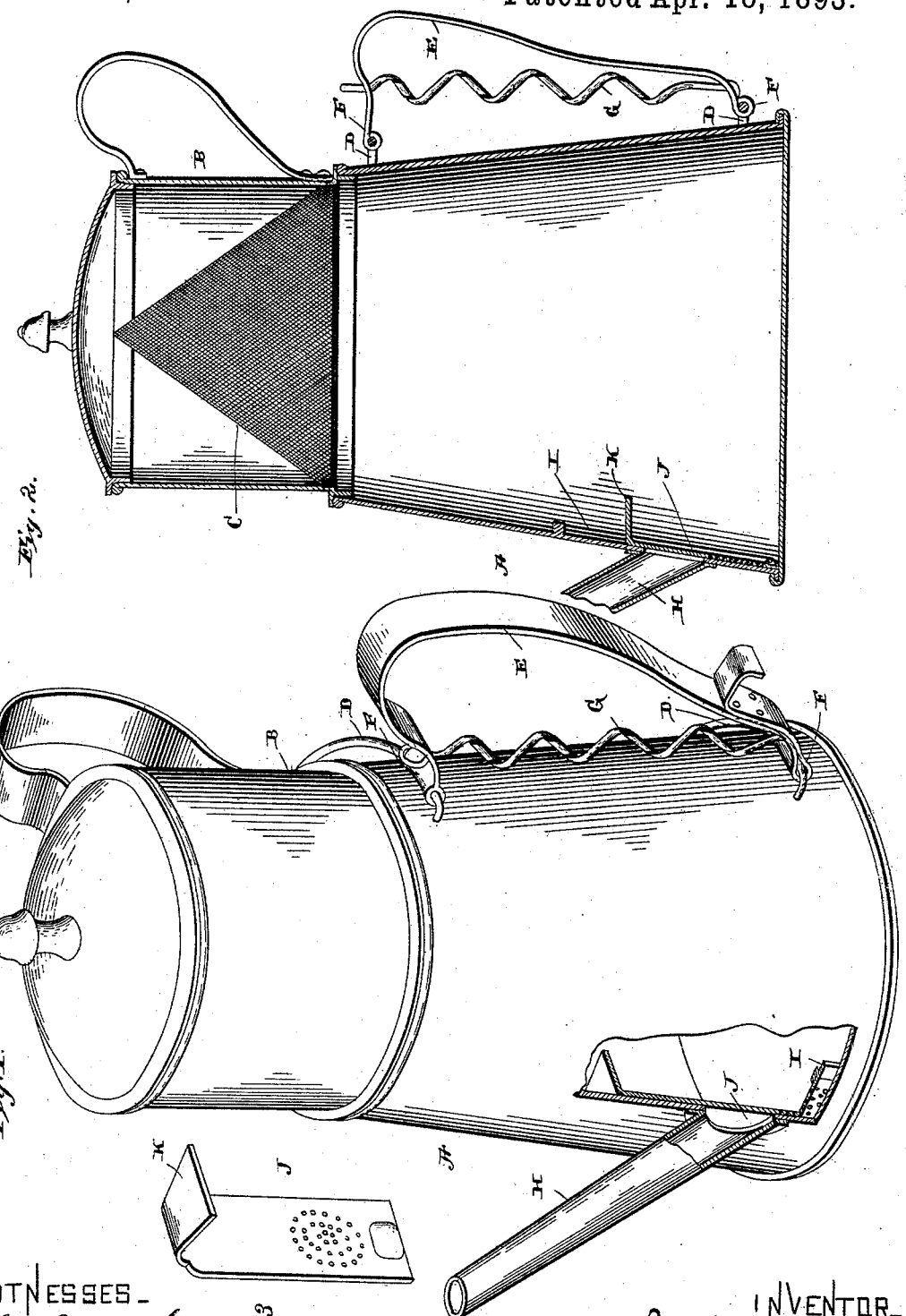
WITNESSES
Geo. E. Frech.
Rob't A. Fitzgerald.
INVENTOR
J. K. Cummings
By Lehmann Pattison & Corbit
att'ys.
THE NORRIS PETERS CO., PHOTO-LITHO., WASHINGTON, D. C.

UNITED STATES PATENT OFFICE.

JAMES K. CUMMINGS, OF LADONIA, TEXAS.

COFFEE-POT.

SPECIFICATION forming part of Letters Patent No. 495,693, dated April 18, 1893.

Application filed June 29, 1892. Serial No. 438,459. (No model.)

*To all whom it may concern:*

Be it known that I, JAMES K. CUMMINGS, of Ladonia, in the county of Fannin and State of Texas, have invented certain new and useful Improvements in Coffee-Pots; and I do hereby declare the following to be a full, clear, and exact description of the invention, such as will enable others skilled in the art to which it pertains to make and use it, reference being had to the accompanying drawings, which form part of this specification.

My invention relates to an improvement in coffee pots; and it consists in the novel features of construction which will be fully described hereinafter, and more particularly referred to in the claims.

The object of my invention is to provide a pot with a movable handle whereby the same may be placed on the opposite side of the pot from the spout or to one side thereof as may be preferred.

A further object of my invention is to provide an automatically acting slide or valve for closing the spout when the same is not in use.

Referring to the accompanying drawings,—Figure 1, is a perspective view of my improved pot a portion of the same being broken away to show the improved slide. Fig. 2, is a vertical sectional view of the same. Fig. 3, is a detached view of the slide.

A, represents the main or body portion of the pot; B, the removable upper portion for holding the coffee grounds, and C, a conical strainer arranged in the latter in the ordinary manner.

Secured respectively near the upper and lower ends of the body portion A, are the parallel wires D, which extend from the back of the same around to one side as shown, the same being curved or bent to conform to the convex surface of the pot.

E, represents the handle proper which is provided at its respective ends with the eyes F, which encircle the wires D, the latter forming a track or guide way for the movement of the handle from the back of the pot to its side or vice versa as desired.

G, represents a coiled spring rod which passes vertically through the handle E, for the purpose of forming a convenient hold for the hand in grasping the handle E. The rod is not liable to become hot and thus the hand of the operator is protected. The rod also serves to hold the handle in the desired adjustment on the wires D.

H, represents the spout and secured to the inner side of the body A, at the lower end of the spout are the guides I, and adapted to move between them is the slide J. The upper end of this slide is provided with the horizontal extension K, so that when the pot is tilted for pouring the coffee the liquid striking the said extension will force the slide upward and allow the coffee to pass out through the perforated lower end of the slide. The lower end of the slide is weighted so as to assist the slide in dropping to its normal position when the pouring has ceased. The operation is automatic and hence the spout is always closed against the escape of steam when coffee is not being discharged therefrom.

Having thus described my invention, I claim—

1. The combination with a pot, of horizontal guides secured to the outer side thereof, and a handle adapted to slide on said guides, substantially as shown and described.

2. The combination with a pot, and horizontal curved guides secured near the respective ends thereof, of a handle adapted to be adjusted on said guides, and a vertical rod which passes down through the handle, substantially as shown and described.

3. The combination with a pot and guides secured to the outer side thereof, of a handle adapted to be adjusted on said guides, and a spiral spring rod adapted to pass down through the handle for holding the same in position on the guides, substantially as shown and described.

4. The combination with a pot and a spout therefor, of a slide adapted to move vertically within the pot over the lower end of the spout and a horizontal projection on the upper end of the slide for the purpose, substantially as shown and described.

In testimony whereof I affix my signature in presence of two witnesses.

JAMES K. CUMMINGS.

Witnesses:
H. P. LANE,
J. B. LANE.